United States Patent [19]

Lang

[11] 4,088,975

[45] May 9, 1978

[54] ALTERNATING CURRENT SOLENOIDS

[76] Inventor: Gregor L. Lang, 295 East St., Suffield, Conn. 06078

[21] Appl. No.: 570,215

[22] Filed: Apr. 21, 1975

Related U.S. Application Data

[60] Division of Ser. No. 215,052, Jan. 3, 1972, abandoned, which is a continuation-in-part of Ser. No. 830,342, Jun. 4, 1969, Pat. No. 3,647,177.

[51] Int. Cl.² .................................... H01H 85/30
[52] U.S. Cl. .................................. 335/244; 335/249; 335/262
[58] Field of Search ............. 335/244, 249, 262, 251, 335/243

[56] References Cited

U.S. PATENT DOCUMENTS

| 1,650,799 | 11/1927 | Lee ........................................ 335/262 |
| 2,357,959 | 9/1944 | Kouyoumjian ....................... 335/262 |
| 2,405,396 | 8/1946 | Bazley ................................. 335/262 |
| 3,082,359 | 3/1963 | Mangiafico et al. ................. 335/260 |

FOREIGN PATENT DOCUMENTS

| 166,213 | 7/1921 | United Kingdom ................. 335/243 |

Primary Examiner—Harold Broome
Assistant Examiner—Fred E. Bell

[57] ABSTRACT

A linear acting solenoid directed to energy conservation. The disclosure combines plural elements usable singly or in combination to enable in aggregate a low cost assembly, yielding values of pull-force per watt of input exceeding ten ounces. Size, cost, and temperature rise are reduced, and shading rings are avoided. Novel elements include a composite phase-splitting core, and a unitary magnetic shell forming an efficient divided-path magnetic circuit, the flux therethrough being confluent through armature and core. In valve or other fluid-barrier uses, a thin ferrous armature housing enables pull values exceeding three ounces per watt of input.

16 Claims, 3 Drawing Figures

ALTERNATING CURRENT SOLENOIDS

BACKGROUND OF THE INVENTION

This application is a division of co-pending application No. 215,052 for Alternating Current Solenoids filed Jan. 3, 1972, now abandoned with in turn is a continuation-in-part of co-pending application No. 830,342 for Alternating Current Solenoids filed June 4, 1969, now U.S. Pat. No. 3,647,177, which in its turn contains subject matter in common with application co-pending therewith No. 783,035 filed Dec. 11, 1968 for Phase-splitting core for Electro-magnetic Devices, now U.S. Pat. No. 3,553,618. Additionally thereto, this application and sequential parents hereof No. 783,035, and No. 830,342 contain subject matter in common with application co-pending therewith No. 103,429 filed Jan. 4, 1971 for Alternating Current Relays, now U.S. Pat. No. 3,735,301 which is referenced herein.

This invention relates to linear acting solenoids used in relays, mechanical actuators, and in fluid-barrier devices including flow control valves. In the design of fluid control valves it has been the practice to provide a cylindrical plunger guide or cup member of non-magnetic material to serve as a housing for the movable valve plunger and a normalizing biasing spring. The housing with appropriate gasketed assembly to the valve body, confines within the cup whatever fluid is controlled by the valve. Such constructions are often referred to as "wet armature" valves. The exciting coil is provided with a magnetic yoke or shell and cylindrical or tubular pole pieces designed to conduct the flux to the vicinity of the plunger housing with a minimum of gaps or magnetic discontinuities, to thereby attain a relatively high magnetic efficiency. The coil is commonly assembled about the housing, such that when energized the flux path is through the wall of the non-magnetic housing and the plunger-armature.

The foregoing non-magnetic material interposed between plunger and pole members precludes attainment of a truly closed magnetic circuit. The housing wall-thickness forms plural gaps across which the flux must pass, on entering and leaving the armature. It is necessary that the housing be of appreciable wall thickness, to withstand the fluid or hydraulic forces often encountered, the typical thickness of a brass or bronze housing being 0.026 inch for a fluid pressure of 125 P.S.I. Similar thicknesses have customarily been used in prior art vapor or atmosphere applications such as vacuum or explosion-proof devices.

Any such interruption of an otherwise closed magnetic circuit has the twofold effect of causing major reductions in impedance and in total flux flowing in the system. Thus for a given applied voltage, high current will flow in the solenoid, coupled with a major weakening of the mechanical pull-force attained by the armature. Ring-shaded poles are ineffective across an interposed gap, which has caused wide usage of long-stroke solenoids having tubular poles, thus adding further to the foregoing effects. High input wattage and rapid temperature rise have been accepted as unavoidable incidences of wet-armature valve constructions heretofore available.

Past efforts to overcome those limitations have included the use of high strength non-magnetic materials such as 18-8 stainless for thin-wall housing constructions, and also at increased manufacturing cost, the use of immersed magnetic poles provided with annular shading rings. But these efforts have provided only slight improvements in electro-magnetic efficiency. The continuing problem is clearly that of providing means of reducing or eliminating the armature series gap; of providing a short-stroke armature characteristic; and of reducing the susceptibility of the solenoid to the power loss and heating effects of induced eddy-currents.

SUMMARY OF THE INVENTION

In accordance with this invention I have found that in fluid barrier solenoids of the type above described, the cup or guide housing the armature may be formed of thin ferro-magnetic material such as A.I.S.I. type 430 stainless steel, chosen from the group known as "straight chrome ferritic". Thin-wall housings may be designed with adequate strength to withstand fluid pressures of the order of ten atmospheres. The use of a magnetic material has the effect of virtually eliminating the magnetic series gap invariably found in prior art fluid-barrier solenoid constructions. Moreover, the use of a thin-walled housing in combination with a piston-like armature and a unitary exterior magnetic yoke or loop, yields a solenoid structure having a low value of magnetic reluctance with a consequent high flux value flowing in the core and armature. Loss-wattage demand is further reducible by the use in combination, of a cylindrical phase-splitting core as disclosed in my sequentially co-pending U.S. Pat. No. 3,553,618, above referenced.

The above mentioned unitary magnetic outer loop is described in my similarly sequential co-pending U.S. Pat. No. 3,647,177, and in pending application No. 215,052 divisional parent hereof.

The above summary relates to a high performance fluid-barrier solenoid suitable for fluid valves and alternate similar uses. It will be obvious to those skilled in the art that the armature housing may be eliminated, with appropriate adjustment of armature diameter, to enable a general purpose solenoid of still higher efficiency. Adequate spring or normalizing load force must be provided, to overcome residual flux effects. An example of this form is disclosed in FIG. 2 of the above referenced U.S. Pat. No. 3,553,618.

The foregoing elements of novelty taken separately or together have the effect of reducing or eliminating the magnetic gaps or reluctances invariably encountered in previous fluid-barrier solenoids with the resultant large increase in total flux, and in flux linking the armature. Eddy current heat losses are reduced, and fluid or mechanical loads on the armature may be greatly increased for a given input wattage. The attainable decrease in current value, input wattage, and temperature rise enable major savings in the weight, size, and cost of the copper winding and solenoid structure required for a given fluid or mechanical load.

It is accordingly an important object of this invention to provide an improved magnetic solenoid of the fluid barrier type having an essentially "gapless" or closed magnetic circuit with resulting improvement at reduced cost, in electro-magnetic efficiency and mechanical force attained by the armature, for a given electrical input.

Another object is to provide in a solenoid of the above general type, a construction wherein for a given armature mechanical load, the electrical input power is reduced whereby the gauge and amount of copper in the solenoid winding may be greatly reduced.

A further object is to provide a solenoid and magnetic circuit of novel character such that the required input power per unit of armature load is decreased, whereby heat dissipation and rate of temperature rise of said solenoid is reduced over the prior art.

Another object is to provide a solenoid and magnetic circuit comprising only three essential ferrous elements in a substantially closed-loop arrangement enabling increased armature forces or fluid loads, for a given value of electrical input power.

A still further object is to provide for a fluid-barrier solenoid, an armature housing constructed of ferromagnetic material having the property of hysteresis to coact with a phase-splitting core as disclosed in my prior application No. 783,035, now U.S. Pat. No. 3,553,618, for enhanced phase shifting effectiveness, and an increased value of 'buzz-free' armature holding force.

Another important object is to provide a solenoid construction of high electro-magnetic efficiency for use in hermetically sealed devices commonly used in vacuum or explosion-proof systems wherein complete isolation is requisite by an impermeable barrier separating the electrical energizing and magnetically actuated elements thereof.

An additional object is to provide a solenoid construction wherein a housing or guide for the armature is constructed of ferro-magnetic material, whereby the distribution of magnetic flux in and around the armature is modified to yield an improved force-versus-distance characteristic, to thereby increase the wide-gap pull-value attained by said solenoid.

Yet another object is to provide a solenoid construction wherein the magnetic circuit thereof comprises three ferrous elements of ample and unimpaired magnetic cross-section arranged in a substantially gapless manner to yield a high impedance solenoid characteristic, and combining good thermal conduction properties whereby any heat generated in the winding and core of said solenoid is rapidly conducted to the outer magnetic shell of said solenoid for dissipation into the surrounding air, whereby the continuous operative temperature of said winding is beneficially reduced.

Another important object is the provision of a solenoid construction of simplified design and low manufacturing cost, usable in either general-purpose or fluid-barrier applications, wherein the outer magnetic shell is of unitary construction forming a dual path magnetic circuit confluent through the core and armature, and is of substantial strength and rigidity, enclosing and protecting the solenoid winding against damage.

BRIEF DESCRIPTION OF THE DRAWING

The foregoing and other objects and advantages of the invention will become apparent from the following description, and the accompanying drawings of a preferred embodiment in which.

PRINCIPLES OF OPERATION

Figure 1:
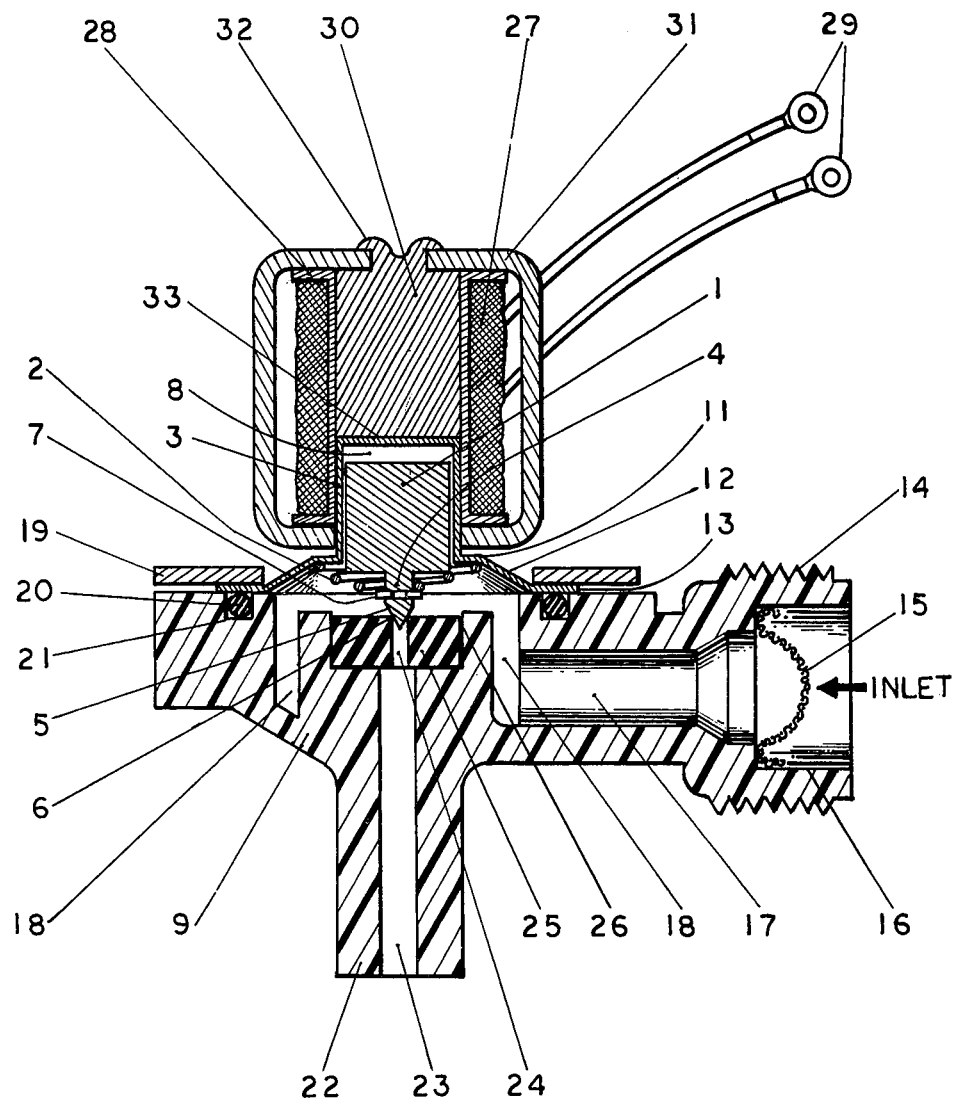
FIG. 1 is a median sectioned view of a solenoid valve embodying solenoid structure and elements according to this invention.

Fluid-barrier solenoid and valve constructions heretofore available were presumably based on the premise that the use of magnetic material as an armature or plunger housing would form a magnetic shunt, bypassing a large portion of the available pulling, or gap-flux, thus adversely affecting the tractive force exerted by the plunger.

This invention utilizes my discovery that a solenoid having an armature housing constructed of ferro-magnetic material of thin wall section behaves in a manner unexpectedly opposite to that long believed. The armature force per watt of input is greatly increased over the prior art constructions using non-magnetic housings, gains in excess of 100% having been observed in tests of this invention. Reference is made to my U.S. Pat. No. 3,647,177 for detailed discussion.

Briefly stated, the foregoing anomalous behavior is explainable; first by the elimination of the non-magnetic material, with a resulting major increase in flux flowing in the magnetic circuit due to decrease in the reluctance thereof; and secondly by the fact that pole-to-pole shunting of flux by the housing wall has a limited adverse effect, the thin ferro-magnetic housing material becoming saturated in the annular area encircling the working gap. The predominant balance of the flux therefore flows through the best alternate magnetic path, presented by the plunger armature.

The unitary solenoid outer shell or loop disclosed herein has its genesis in the classical "ideal core", the iron torus. This is a simple iron ring of generous cross-section, the exciting coil being wrapped around an arcuate portion thereof. The ideal ring has no joints transverse to the flux path, since such junctions however carefully joined represent a cumulative reluctance offsetting a portion of the available exciting m.m.f. They should be avoided except as needed for assembly.

In A.C. service a solid torus is subject to undesirable heat rise and watt-loss arising from induced eddy-currents flowing throughout its cross-section. This loss may be largely overcome by "lamination", the torus being sub-divided into a stacked series of laminar iron rings totalling the cross-sectional area of the original.

A useful first approximation of the foregoing is to divide the torus into two equal rings arranged in a "figure eight" manner, with the exciting coil wrapped through the two toroids in the area of tangency. Thus are established two separate magnetically parallel flux paths of reduced cross-section, and reduced susceptibility to eddy-current losses, having a single exciting coil in common. It will now be apparent that the flux may be considered as separated through the external rings, and confluent through the coil.

My magnetic circuit including the unitary outer magnetic shell embodys the principles of the foregoing three paragraphs in a form which is simple, low in cost, and of relatively high magnetic efficiency suitable for A.C. service. In order to maintain a uniform cross-section throughout the magnetic circuit, and avoid flux restrictions, the flat ferrous strip forming the outer shell is in thickness equal to one quarter of the core diameter, the width being minimum 1.8 times the core diameter.

The above ferrous strip is formed into a closed rectangular loop having its abutting ends coinciding with the axis of the cylindrical core at its point of attachment to the loop. This novel arrangement interrupts a major eddy-current path in an area where the flux concentrates as it converges into confluence about the attached end of the cylindrical core. Heat loss is minimized, and magnetic symmetry is established, insuring equal flux flow in the opposed loop sides.

Figure 2:
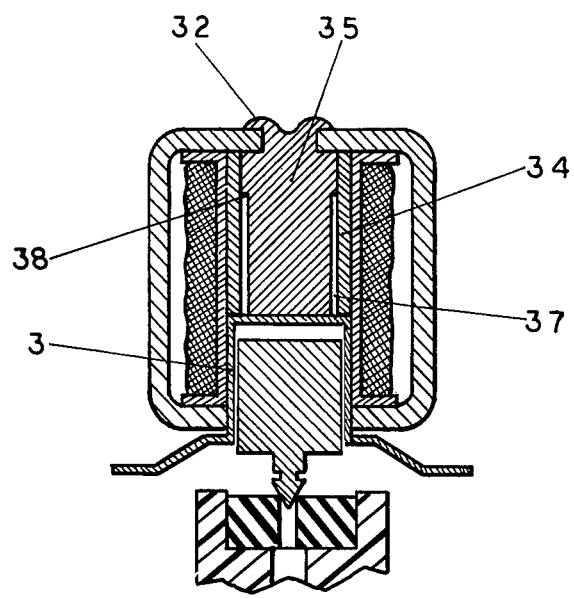
FIG. 2 is a median sectioned view of an alternative solenoid construction embodying a phase-splitting core according to my prior application No. 783,035, now U.S. Pat. No. 3,553,618 combined herewith.
Figure 3:
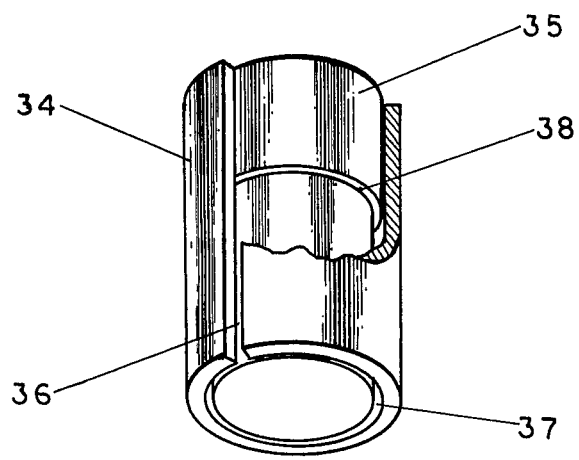
FIG. 3 is an enlarged partially sectioned view showing assembly and key gap details of the composite core of FIG. 2.

An additional element of novelty contributing to the improved performance and efficiency of the solenoids disclosed, is a phase-splitting core as disclosed in FIGS. 2, and 3, hereof, and which serves the purpose of the prior art shading ring, with reduced watt-loss and significantly improved efficiency. Briefly, it consists of a composite cylindrical core excited by close association with the solenoid coil, and comprised of two coaxially disposed ferrous members separated by a small annular gap extending therebetween.

The outer sleeve is the leading phase flux path, being constructed of a low hysteresis ferrous material, and having an axially aligned slot interrupting the peripheral circulating current which would otherwise flow therein. The inner member, generally of solid cylindrical form is constructed of a moderately hysteretic mild steel. It generates the lagging phase flux wave by virtue of its inherent hysteresis lag, combined with the flux retarding effect of eddy-current flow throughout its length.

Further discussion of this phase-splitting technology may be found in the foregoing referenced U.S. Pat. Nos. 3,553,618, 3,647,177, and 3,735,301.

DESCRIPTION OF THE PREFERRED EMBODIMENT

Referring more particularly to the drawings wherein similar reference characters designate corresponding parts throughout the various views; FIG. 1 is a median sectional view of a fluid barrier form of the present invention incorporated in a flow-control valve in which cylindrical armature 1, and a bias spring 2, are enclosed by armature housing 3, said housing being optionally constructed of ferro-magnetic or non-magnetic material, and so dimensioned as to permit free axially slidable motion therein by plunger armature 1.

Cylindrical armature 1 is formed with a projecting stem portion 4, arranged to operatively connect a chosen mechanical load to armature 1. In the present valve example the valve-stem portion 4 has at its lower end an integrally formed conical valve portion 5, designed to enter and seal fluid orifice 6, under the influence of bias spring 2, when the solenoid is de-energized. An equivalent armature motion stop is required in many applications, to establish the de-energized limit of armature travel and thereby define the total armature travel dimension.

Bias spring 2 is of the conical compression type having its large diameter upper end supported by annular shoulder portion 11 formed in housing member 3, and having its small diameter lower end engaged with valve stem 4, by snap ring 7 or other suitable means. Compression spring 2 thus biases armature 1 in downward sealing engagement with fluid orifice 6 when the solenoid is deenergized.

When so biased the upper surface of armature 1 is separated from the inner abutting surface of housing guide cup 3, thus forming working gap 8 which allows upward motion of armature 1 when the solenoid is energized.

The magnetic solenoid is assembled over the cylindrical cup portion of housing 3, coaxial therewith. The solenoid is comprised of copper winding 27 on insulating spool 28, and is connected to the external power source by terminals or leads 29. The winding encloses soft iron core piece 30, and is enclosed by mild steel magnetic outer shell 31 to which pole piece 30 is attached at top center 32. While outer shell 31 may be fabricated from short lengths of squared mild steel tubing, the preferred form comprises a strip of mild steel of elongate rectangular form, formed in a closed box-like rectangular loop. The line of abutment of the strip ends is at top center, substantially at the axis of core piece 30, as described elsewhere herein.

The abutting engagement may be mechanically retained by suitable means such as an interlocking dovetail, or by spot-welding at the corners. It should preferably not be through-welded the full length of the abutment, for reasons of eddy-current reduction.

Magnetic shell 31 has in its lower surface a bore or hole dimensioned to fit snugly over the cylindrical cup portion of housing 3 which extends into winding spool 28 to abut the lower end of core 30. The magnetic circuit linking solenoid 27 is thus completed in an effectively closed manner. A dimensional length of core 30 equal to 75% of the length of solenoid 27 has yielded favorable results in tests of the present invention. The foregoing snug fit over the housing cup should be observed to avoid an unwanted series gap, and to insure concentric assembly such that the flux will be symmetrically apportioned between the two external flux paths.

FIG. 1 depicts the solenoid in the deenergized state, with armature 1 in the downward position thus forming axial gap 8 separating armature 1 from the diaphragm portion of housing 3. When housing 3 is constructed of ferro-magnetic material such as A.I.S.I. 430 stainless steel, a high value of performance is obtained, the mode of operation being postulated as follows: Upon energization the magnetomotive force deriving from the current flow in solenoid 27 gives rise to a concentration of flux flowing axially in the thin cylindrical wall of housing 3, with a resulting saturation of the wall in the area encircling gap 8. The excess of available flux beyond the saturation level is thus diverted radially through the wall of housing 3, thence axially through armature 1, across gap 8, and through diaphragm 33 to core 30. The armature thus develops a substantial pulling force causing it to rise, compressing spring 2 and overcoming the hydraulic load to uncover fluid passage 24.

It can be noted that the upward travel of armature 1 causes working gap 8 to vanish, with the previous gap space then becoming occupied by the upper portion of armature 1. This completes a low reluctance link in the solenoid magnetic circuit, of relatively large cross-section and low susceptibility to saturation, with the solenoid reactance rising to a relatively high value. A result is a re-distribution of flux whereby the greater part of the total flux passes axially through armature 1 under both open gap, and closed gap conditions.

It is therefore postulated that the housing wall operates in two differing sequential magnetic states, varied by the motion or position of armature 1 acting as a magnetic switch. The housing wall is saturated by the high inrush current at energization with transition into a less saturated state as armature 1 reaches the full stroke or zero gap position, with flux re-distributing and with solenoid current dropping to the lower steady-state value. Both states result in the flow of major values of flux into and through armature 1, thereby enabling the development of usefully high values of tractive and sealed or holding force, with the holding or steady state current and wattage held to previously unattainably low values.

In the liquid valve arrangement of FIG. 1 the use of a closely fitted housing 3 enclosing the armature provides further functional benefits deriving from the inherent dash-pot damping effect. Said damping serves to reduce the tendency of the A.C. solenoid to produce intermittent pull forces and buzzing sounds, when phase-splitting means are not employed, as in FIG. 1 wherein core 30 is of the solid cylindrical type.

The force and rate of bias spring 2 is an important design factor since spring force and the diametral armature clearance are basic in determining the rate at which armature 1 moves downward after de-energization of solenoid 27. Moreover in the general purpose form of this invention, the armature housing 3 would ordinarily be omitted with the old problem of residual flux or "sticking armature" appearing. The spring should be designed such that its force taken together with the mechanical load on the armature is sufficient to reliably disengage the armature from the pole face of core 30, when the solenoid is deenergized.

I have shown bias spring 2 as located in the lower enlarged conical portion of housing 3, and situated entirely exterior of the loop magnetic circuit defined by armature 1, core 30, and loop 31. This is to avoid the frequently seen prior art practice of using a small cylindrical coil spring situated in a blind axial clearance hole bored in the working gap-face of either core or armature. Any such hole in the magnetic circuit has the undesirable effect of causing loss of pulling force, and restricting the cross-sectional area available for flux flow, thus tending toward saturation and power loss, and in part negating the performance improving elements otherwise provided herein.

FIG. 2 depicts a solenoid construction in which a phase-splitting core of a self-shading class disclosed in my above referenced U.S. Pat. No. 3,553,618 is employed in lieu of the plain cylindrical core 30, of FIG. 1. This combination yields a further major improvement in magnetic efficiency and attainable pull-force per watt over the values attainable with said cylindrical core. The solenoid construction of FIG. 2 has structural and magnetic features in common with FIG. 1, and is directly usable therewith. The foregoing related solenoid description is thus applicable to FIG. 2.

The two-piece annular core 34 and 35 makes use of the discovered fact that hysteresis and eddy-currents in flux-conducting core members may be economically and efficiently used to obtain phase retardation and resulting phase-splitting in A.C. devices in lieu of shading rings heretofore used for that purpose. The core assembly including soft iron outer sleeve 34, and mild steel inner core member 35 is shown in section in FIG. 2, and also in enlarged section in FIG. 3 which discloses the annular and peripheral gap means which contribute to the phase-splitting function and high magnetic efficiency characteristics of said core assembly.

Outer cylindrical core member 34 is the leading phase flux path being designed to introduce a minimum of phase retardation of the flux wave flowing therethrough. To that end it is constructed of a low hysteresis material such as silicon steel, or annealed ingot iron. It is further provided with a longitudinal slot 36 extending the full length of the sleeve thus interrupting the phase-retarding circumferential circulating current which would otherwise flow therein. The flux wave flowing in sleeve 34 is thus substantially in-phase with the alternating magnetomotive force established by the current flowing in exciting coil 27. The slot width is uncritical, a width of 0.10 inch to 0.15 inch having yielded favorable results.

Inner cylindrical core member 35 is the lagging phase or retardant flux path, being designed to effect a substantial value of flux wave retardation by the combined effects of hysteresis and internal circulating currents. Member 35 is constructed of a mild steel such as A.I.S.I. C-1117 which is characterized by a moderate degree of inherent hysteresis or remanence, such as to cause an effective value of phase retardation of the flux wave flowing therethrough. Moreover, member 35 is designed as an unbroken cylindrical body which is subject to the flow of circular induced eddy-currents throughout its length. Said eddy-currents operate magnetically to oppose change in the instantaneous flux value flowing in said member, thus retarding the phase of the resultant flux wave, in addition to the hysteresis phase retardation aforesaid. The resultant angular phase lag is thus a composite value which may be considered as the vector sum of the two lag angles obtained separately from the retarding effects of hysteresis and eddy-currents.

An annular gap 37 provides a magnetic separation of the two members 34, and 35, to avoid inter-phase shunting or commingling due to close proximity. In FIG. 3, gap 37 is produced by forming member 35 with a step or shoulder 38 to slightly reduce the diameter of the lower portion of core 35. A shoulder radial dimension of 2½% of the outside diameter of sleeve 34 has yielded satisfactory phase separation. The axial length of gap 37 is relatively uncritical, optimum length appearing to be between 70% and 90% of the length of sleeve 34. The gap space thus formed may be filled with a plastic or solid insulating material if desired.

It will be apparent to those skilled in the art that many changes may be made in the application, arrangement of parts, and details of construction of the solenoid devices described herein without departing from the spirit of the invention as expressed in the appended claims. Moreover it will be understood that the applications shown as applied to flow controlling fluid valves are by way of illustration only, and that the several advantages of the invention are applicable to other tractive solenoid uses such as relays, clutches, and general purpose solenoid applications. The fluid barrier form, useful in valves is applicable to diverse uses wherein actuation is required through a wall or barrier enclosing at least one system or volume.

TESTS OF THE INVENTION

During development of the present invention, a non-magnetic housing 3 was constructed for comparison purposes, in all dimensions identical with the foregoing ferro-magnetic housing 3. It was of 18-8 stainless steel in accordance with prior art valve practice. Tests performed on the valve construction of FIG. 1, using the non-magnetic housing disclosed a substantial performance advantage in terms of pull force per watt, over a commercial prior art water valve. The test values are disclosed in a comparative performance following below. This starting improvement is believed to derive from the novel structure and elements as disclosed in combination including; The short-gap solenoid; The unitary dual-path magnetic circuit having low reluctance and eddy-current susceptibility; And the above described liquid motion damping effect. The foregoing initial improvement should be taken into account in evaluating the further advantages contributed by my ferro-magnetic housing, and phase-splitting core.

In the absence of mathematical expressions reliably applicable to the present invention, an experimental test program was undertaken to provide a basis for mathematical definition, and to establish optimum dimensions, materials, and size ratios for a water valve application similar to FIGS. 1, and, 2 hereof.

A flow rate of 1.0 g.p.m. was chosen, with operation on 115 V. 60 H. A.C., at a water gauge pressure of 60 p.s.i. The diameter of fluid passage 24 was established as 0.072 inch, and an armature travel of 0.063 was chosen, thus setting the axial dimension of working gap 8 at 0.063 inch. An armature open-gap (inrush) pull requirement of 10 oz. was established to allow a reserve over the maximum load values to be met.

The following dimensions and size ratios were established:

Coil spool 28, length o.a., 0.820 inch, winding length 0.760 inch.
Coil 27, 3900 t. # 39 or 40 B&S ga. copper, weight 11 or 8 gms.
Core 30, 0.600 inch long, 0.437 inch dia., magnetic ingot iron.
Core sleeve 34, 0.600 inch 1., 0.437 inch dia., 0.062 inch wall, magn. ingot iron.
Core 35, 0.600 inch long, dia's. 0.296 inch & 0.316 inch, C-1117 c.r.s.
Housing 3, cup 0.437 inch o.d., 0.405 inch i.d., 430 s.s & 18-8 s.s.
Magn. shell 31, 12 ga. × 0.812 inch w. 1012 h.r.s. Butt at top center.
Armature 1, dia. 0.395 inch to 0.400 inch. Plunger length 325 inches, 430 s.s.

For evaluation purposes a numerical performance factor of merit "P" was devised as an expression of open-gap pull in ounces attainable, per watt of steady-state electrical input. For the present examples "P" becomes 10 (oz.) divided by the measured input watts (w.) for the closed gap steady-state condition. A commercial prior art water valve of similar capacity was included in the test series as a comparison base, with the supply voltage adjusted to enable 10 Oz. of armature pull at inrush. At that voltage it consumed 16 watts steady-state, yielding a value P = 0.625.

Values obtained for present invention:
Assembly of FIG. 1, non-magnetic housing 3, w. = 9.50, P = 1.05
Assembly of FIG. 2, non-magnetic housing 3, w. = 7.80, P = 1.28
Assembly of FIG. 1, magnetic housing 3, w. = 5.85, P = 1.71
Assembly of FIG. 2, magnetic housing 3, w. = 3.10, P = 3.22

In addition to the foregoing, general and special purpose solenoids of the non fluid-barrier type, constructed in accordance with FIG. 2, with housing 3 eliminated, have yielded "P" values in excess of 10.0. Illustrations are found in the above referenced co-pending U.S. Pat. Nos. 3,735,301, and 3,553,618.

The use in this invention of hysteretic materials has been found not to cause undue difficulties with "sticking armature" due to remanence or residual flux. Annealing of outer shell 31 after forming is desirable however, attention to the force and rate of spring 2 has provided freedom from residual flux problems. It thus appears that magnetic housing 3 serves beneficially as a saturable magnetic shunt, bypassing around armature 1 a major portion of the residual flux arising in parts such as core 30, shell 31, or core 35. This is a further inherent advantage of the present invention.

From the foregoing it will be apparent that I have provided novel, simple, and economical means of attaining the objects and advantages recited.

Having described my invention, I claim:

1. In an electromagnetic solenoid having in combination a coil with a ferrous core and a ferrous plunger armature extending axially therein, said armature being adapted for the operative attachment thereto of a chosen external load, and a ferrous structure exterior of said coil forming with said core and said armature a substantially closed loop magnetic circuit linking said coil;

the improvement thereof comprising, said exterior structure comprising a unitary member forming a closed quadrate loop defining a plurality of divisional flux paths therethrough disposed about said coil in substantial symmetry and characterized by substantial coequality in length, thickness, and magnetic cross-section, thereof, said exterior member being in direct joined assembly with one end of said core with the divided flux in said member flowing in magnetic confluence through said core, said loop magnetic circuit comprising only said three specified discrete ferrous elements.

2. An electromagnetic solenoid as set forth in claim 1 wherein said core is constructed of a soft low-carbon ferrous material and of solid imperforate construction.

3. An electromagnetic solenoid as set forth in claim 1 wherein said loop magnetic circuit embodies phase-splitting means magnetically operative on said armature.

4. An electromagnetic solenoid as set forth in claim 3 wherein said phase-splitting means is of the class having spaced plural fixedly associated ferro-magnetic portions relatively disparate in the magnetic properties thereof including magnetic hysteresis and eddy-current susceptibility.

5. An electromagnetic solenoid as set forth in claim 1 wherein said armature is disposed for axial operative motion within a unitary housing, a portion thereof being of tubular construction having one end closed by a transverse diaphragm portion and extending within said coil, said diaphragm portion abutting an end of said core and defining the energized limit of motion of said armature.

6. An electromagnetic solenoid as set forth in claim 5 wherein an enlarged portion of said housing extending outwardly of said solenoid is adapted for hermetically sealed closure of an aperture in a wall or barrier confining at least one volume or fluid system.

7. An electromagnetic solenoid as set forth in claim 1 wherein said exterior unitary member comprises a strip of ferrous material of elongate rectangular plan formed in a closed quadrate loop having the ends of said strip in retained co-abutment intermediate one side of said loop, the projected axis of said core intersecting said abutment centrally thereof and substantially perpendicular thereto, said core being disposed inwardly of said loop.

8. An alternating current solenoid having in combination a coil with a ferrous core and a ferrous plunger armature extending axially therein, and a ferrous structure exterior of said coil forming with said core and said armature a substantially closed loop magnetic circuit linking said coil;

the improvement thereof comprising, said exterior structure defining a plurality of divisional flux paths therethrough and being of unitary construction comprising a strip of ferrous material of elongate rectangular plan formed in a closed quadrate loop having the ends of said strip in retained co-abutment intermediate of one side of said loop, the projected axis of said core intersecting said abutment centrally thereof and substantially perpendicular thereto, said core being disposed interior of said loop, said magnetic circuit comprising only said three specified discrete ferrous elements.

9. An alternating current solenoid as set forth in claim 8 wherein the cross-sectional areas of said plural flux paths are in sum at least equal to the cross-sectional area of said core.

10. An alternating current solenoid as set forth in claim 8 wherein said loop magnetic circuit embodies phase-splitting means magnetically operative on said armature.

11. An alternating current solenoid as set forth in claim 8 wherein said armature is disposed for axial operative motion within a housing, a portion thereof being of tubular construction having one end closed by a transverse diaphragm portion and extending within said coil with said diaphragm substantially abutting an end of said core, said housing including said diaphragm being of unitary construction throughout.

12. An alternating current solenoid as set forth in claim 11 wherein an enlarged portion of said housing extending outwardly of said solenoid is adapted for hermetically sealed closure of an aperture in a wall or barrier confining at least one volume or fluid system.

13. In an electromagnetic solenoid having in combination a coil with a ferrous core and a ferrous plunger armature extending axially therein, and a ferrous structure exterior of said coil forming with said core and said armature a substantially closed loop magnetic circuit;

the improvement thereof comprising, said magnetic circuit including phase-splitting means magnetically cooperative between said core and said armature, said core and said armature being of cylindrical form in an axially co-extensive operative arrangement and forming substantially planar cooperative magnetic poles, the diameters of said poles being relatively disparate.

14. An electromagnetic solenoid as set forth in claim 13 wherein said phase-splitting means is embodied in said core.

15. An electromagnetic solenoid as set forth in claim 13 wherein said phase-splitting means is of the class including plural spaced ferromagnetic portions defining discrete magnetically parallel flux paths therethrough, said portions being relatively disparate in at least one of the electro-magnetic properties thereof including magnetic hysteresis and eddy-current susceptibility.

16. In an electromagnetic solenoid having in combination a coil with a ferrous core and a ferrous plunger armature extending axially therein, said armature being adapted for the operative attachment thereto of a chosen mechanical load, and a ferrous structure exterior of said coil forming with said core and said armature a substantially closed loop magnetic circuit linking said coil;

the improvement thereof comprising, said exterior structure comprising a unitary member forming a closed quadrate loop defining a plurality of divisional flux paths therethrough disposed about said coil in substantial symmetry and characterized by substantial co-equality in length, thickness, and magnetic cross-section thereof, said exterior member being in direct joined assembly with one end of said core with the divided flux in said member flowing in magnetic confluence through said core, said armature being disposed for axial operative motion within a unitary ferrous housing, a portion thereof being of tubular construction having one end closed by a transverse diaphragm portion and extending within said coil, said diaphragm portion substantially abutting an end of said core and defining the energized limit of motion of said armature, said loop magnetic circuit comprising only said four specified discrete ferrous elements.

* * * * *